(12) United States Patent
Magg (10) Patent No.: US 6,573,333 B2
(45) Date of Patent: Jun. 3, 2003

(54) MIXTURES OF OLEFIN POLYMERS AND NITRILE RUBBERS

(75) Inventor: Hans Magg, Kürten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/932,901

(22) Filed: Aug. 20, 2001

(65) Prior Publication Data

US 2002/0077424 A1 Jun. 20, 2002

(30) Foreign Application Priority Data

Aug. 22, 2000 (DE) .......................... 100 41 235

(51) Int. Cl.⁷ .................. C08L 23/18; C08L 23/16; C08L 7/00; C08L 9/00
(52) U.S. Cl. .................. 525/192; 525/191; 525/232; 525/238; 525/240
(58) Field of Search ................ 525/191, 192, 525/232, 238, 240

(56) References Cited

U.S. PATENT DOCUMENTS

| | | | |
|---|---|---|---|
| 3,492,370 A | 1/1970 | Wirth | 260/889 |
| 3,700,637 A | 10/1972 | Finch, Jr. | 260/83.3 |
| 4,337,329 A | 6/1982 | Kubo et al. | 525/339 |
| 4,384,081 A | 5/1983 | Kubo et al. | 525/339 |
| 4,452,951 A | 6/1984 | Kubo et al. | 525/339 |
| 4,464,515 A | 8/1984 | Rempel et al. | 525/338 |
| 4,503,196 A | 3/1985 | Rempel et al. | 525/338 |
| 4,576,992 A | 3/1986 | Buding et al. | 525/211 |
| 4,581,417 A | 4/1986 | Buding et al. | 525/338 |
| 4,826,721 A | 5/1989 | Obrecht et al. | 428/252 |
| 5,013,793 A | 5/1991 | Wang et al. | 525/195 |
| 5,349,020 A * | 9/1994 | Okada et al. | 525/232 |
| 5,556,919 A * | 9/1996 | Oyama et al. | 525/189 |
| 5,621,045 A | 4/1997 | Patel et al. | 525/237 |

FOREIGN PATENT DOCUMENTS

| | | |
|---|---|---|
| EP | 0 171 926 | 2/1986 |
| EP | 0 432 923 | 6/1991 |
| EP | 0 995 777 | 4/2000 |
| GB | 1558491 | 1/1980 |

* cited by examiner

Primary Examiner—Nathan M. Nutter
Assistant Examiner—Thao Tran
(74) Attorney, Agent, or Firm—Joseph C. Gil; Noland J. Cheung; Jennifer R. Seng (57) ABSTRACT

This invention relates to a mixture containing one or more olefin rubbers and one or more nitrile rubbers, to a process for the production thereof, to a vulcanizable mixture and to a process for the production thereof as well as to moldings of all kinds producible from the mixtures.

15 Claims, 4 Drawing Sheets

MIXTURES OF OLEFIN POLYMERS AND NITRILE RUBBERS

FIELD OF THE INVENTION

This invention relates to a mixture containing one or more olefin rubbers and one or more nitrile rubbers, to a process for the production thereof, to a vulcanizable mixture and to a process for the production thereof as well as to moldings of all kinds producible from the mixtures.

BACKGROUND OF THE INVENTION

Mixtures (blends) of incompatible elastomers are frequently encountered in industrial rubber articles. In general, the polymer components are mixed in a single mixing operation together with conventional additives without any particular measures being implemented to improve phase structure.

It is often observed in such processes that the expected improvements in certain material properties are accompanied by considerable disadvantages in other properties which are the result of insufficiently uniform distribution of the polymer phases in the blends. Mixtures containing EPDM may be taken by way of example. In mixtures with nitrile rubber (NBR), EPDM primarily improves low temperature flexibility. In contrast, other properties, such as vulcanizate strength and oil swelling, are impaired.

Improved mixing processes provide complicated, often multistage processes which are time-consuming and entail excessive mixing costs.

Figure 1:
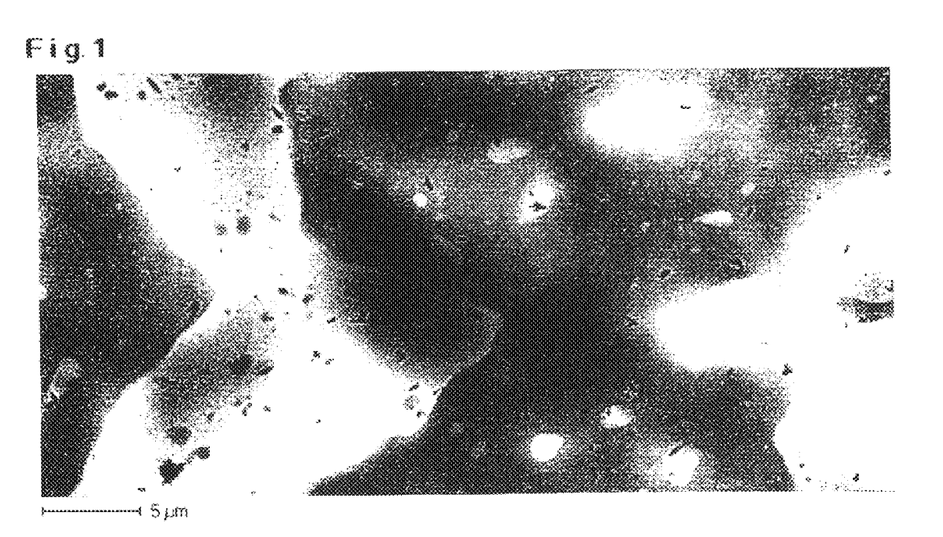
FIG. 1 shows the phase distribution in a mixture according to the prior art.

Mixtures of olefin polymers with nitrile rubbers are known, for example, from EP-A2-0 146 068, EP-A1-0 773 255 and U.S. Pat. No. 3,492,370. Although, macroscopically, these mixtures appear homogeneous, extensive domains of disperse phases are clearly evident on examination by phase-contrast microscopy (FIG. 1).

SUMMARY OF THE INVENTION

Therefore, the object of the present invention is to provide a mixture of olefin rubber and nitrile rubber having improved properties.

This object is achieved by a mixture containing one or more olefin rubbers and one or more nitrile rubbers, characterized in that there is no phase segregation in the mixture.

DETAILED DESCRIPTION OF THE INVENTION

For the purposes of the present invention, olefin rubber is taken to mean copolymers prepared from ethylene and one or more α-olefins, terpolymers prepared from ethylene, one or more α-olefins and one or more unconjugated dienes, as well as mixtures of polymers containing the stated polymers.

The α-olefins are here in particular selected from the group of propylene, 1-butene, 1-pentene, 1-hexene, 1-heptene, 1-octene and 1-nonene, very particularly propylene, 1-butene, 1-hexene and 1-octene.

The unconjugated dienes are selected from the group of 1,4-hexadiene, 1,5-heptadiene, 5,7-dimethyl-1,6-octadiene, 7-methyl-1,6-octadiene, 4-vinyl-1-cyclohexene, 5-ethylidene-2-norbornene, 5-vinyl-2-norbornene and dicyclopentadiene, preferably 1,4-hexadiene, 7-methyl-1,6-octadiene, 5-ethylidene-2-norbornene, 5-vinyl-2-norbornene and dicyclopentadiene.

Suitable olefin rubbers generally have Mooney viscosities (DIN 53 523, ML 1+4, 125° C.) of 20 to 100 MU, in particular of 25 to 80 MU, wherein it is, however, also possible to use liquid olefin rubbers, in particular liquid EP(D)M rubbers.

Nitrile rubbers are diene/(meth)acrylonitrile copolymers. Isoprene and, in particular, butadiene are preferred dienes. The copolymers have a content of copolymerized acrylonitrile and/or methacrylonitrile units of 5 to 60, preferably of 10 to 50 wt. %.

Furthermore, hydrogenated nitrile rubbers are explicitly included in the class of nitrile rubbers. For the purposes of this invention, "hydrogenated nitrile rubber" or "HNBR" should be taken to mean nitrile rubbers, the C=C double bonds of which are partially or completely hydrogenated in a selective manner (i.e. without hydrogenation of the C≡N triple bond). Preferred hydrogenated nitrile rubbers are those having a degree of hydrogenation, relative to the C=C double bonds originating from the butadiene, of at least 75, preferably of at least 90, in particular of at least 95%. The degree of hydrogenation may be determined by NMR and IR spectroscopy.

The hydrogenation of nitrile rubber is known from U.S. Pat. No. 3,700,637, DE-A-2 539 132, DE-A-3 046 008, DE-A-3 046 251, DE-A-3 227 650, DE-A-3 329 974, EP-A1-0 111 412 and FR-B-2 540 503, wherein the stated documents are hereby incorporated into the present application as a reference for the purposes of US patent practice. Hydrogenated nitrile rubber is characterized by elevated tear strength, low abrasion, slight residual deformation after exposure to compressive and tensile stresses and good oil resistance, but in particular by remarkable resistance to thermal and oxidative exposure. Hydrogenated nitrile rubbers are accordingly preferred for the purposes of the invention.

Suitable nitrile rubbers generally have Mooney viscosities (DIN 53 523, ML 1+4, 100° C.) of 25 to 120 MU, in particular of 40 to 100 MU, wherein it may, however, also be advantageous to use liquid nitrile rubbers.

Figure 2:
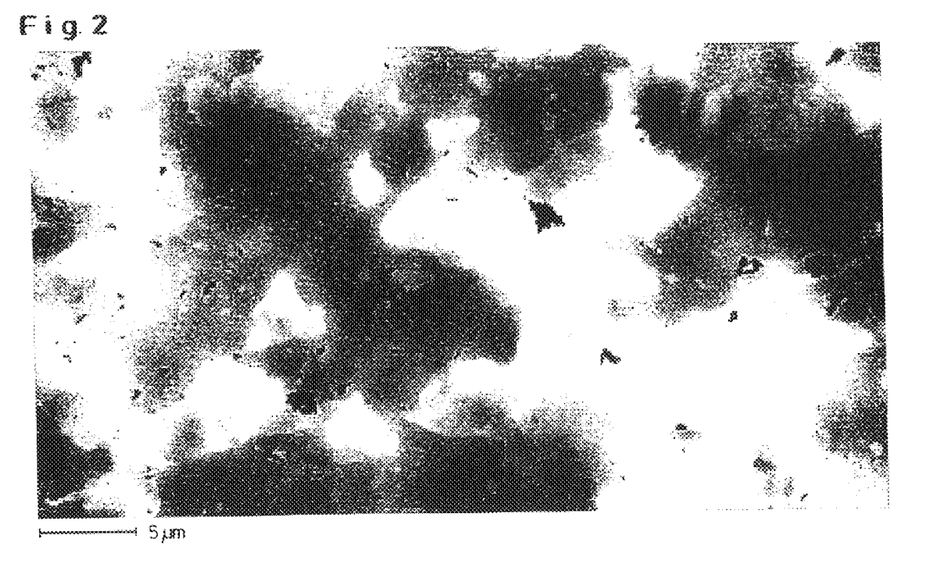
FIGS. 2 and 3 show the improvement achieved by the process according to the present invention.
Figure 3:
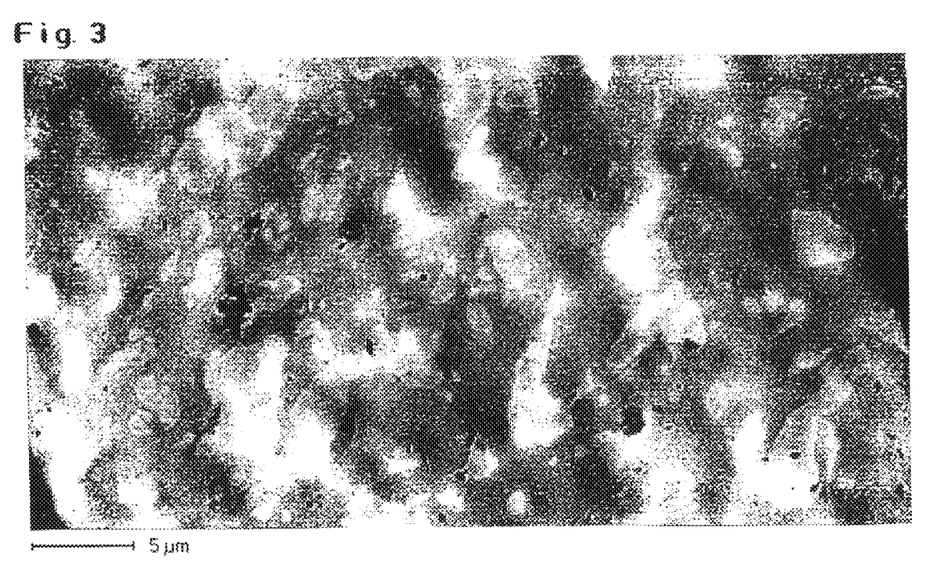

For the purposes of the invention, phase segregation is taken to mean that the domains of the disperse phases have an average diameter of less than 10 μm. It should be noted in this connection that the phases do not comprise spherical structures, but instead irregular structures with indentations and protruberances (c.f. FIGS. 1–3), such that the diameter should in each case be measured at the narrowest point. However, it is frequently possible to make an initial assessment visually by phase-contrast microscopy. The difference between the mixtures according to the present invention and the prior art is thus significant from a comparison of FIGS. 1–3 (FIG. 1 in comparison with FIGS. 2 and 3).

The average diameters of the domains of the disperse phases are preferably less than 5 μm.

The present application also provides a process for the production of a mixture containing one or more olefin rubbers and one or more nitrile rubbers, characterized in that, before or during production of the mixture, small quantities of a vulcanizing system which is active at the mixing temperature, in particular a peroxide system having a decomposition temperature below the mixing temperature, are added.

Usable mixing units comprise any mixing units for rubbers known to the person skilled in the art, in particular kneaders, roll mills and extruders.

The Mooney value of the mixture rises during the mixing process. The necessary quantity of vulcanizing agent, in particular peroxide, is dependent upon the intended purpose of the mixture and the desired increase in Mooney value, but may readily be determined by some preliminary testing. Complete vulcanization of the mixtures should, however, not occur at this point. As stated, it is known that the quantity of vulcanizing agent required is indirectly proportional to the residual double bond content of the rubber.

The aim of the mixing process is to produce the mixture in such a manner that greater than 90, preferably greater than 95 wt. %, relative to rubber, may be extracted by 10 hours' extraction in a Soxhlet apparatus with toluene or a solvent from the group consisting of dichlorobenzene, methyl ethyl ketone or mixtures thereof as the extracting agent. The mixture should, thus, not be completely vulcanized.

For the purposes of the invention, vulcanization means that less than 10, preferably less than 5 wt. %, relative to rubber, may be extracted by 10 hours' extraction in a Soxhlet apparatus with toluene as the extracting agent.

It is vital to the invention that the vulcanizing agent is active at or below the mixing temperature, i.e. it initiates vulcanization. In the case of peroxides, it is thus vital that the decomposition temperature of the peroxide system is below the mixing temperature. Depending upon the mixing temperature, the following are examples of peroxides which are suitable for the process according to the present invention:

bis-(2,4-dichlorobenzyl) peroxide
dibenzoyl peroxide
bis(4-chlorobenzoyl) peroxide
1,1-bis(t.-butylperoxy)-3,3,5-trimethylcyclohexane
tert.-butyl perbenzoate
2,2-bis-(t.-butylperoxy)butene
4,4-di-tert.-butyl peroxynonylvalerate
2,5-dimethyl-2,5-di(tert.-butylperoxy)hexane.

Since it is advantageous to perform mixing at below 190° C., 2,5-dimethyl-2,5-di(tert.-butylperoxy)hexane is preferred.

The quantities of peroxide are generally in the range from 0.2 to 5 phr, preferably in the range from 0.5 to 3 phr, relative to rubber.

The peroxides may advantageously also be used in polymer-bound form.

Further suitable vulcanizing agents are sulfur or sulfur donors as well as combinations of these components.

Sulfur may be used as soluble or insoluble sulfur, as a mixture thereof (pulverulent, coated) or in another suitable form, for example as a premixed mixture of sulfur and rubber or "sulfur batch". The rate of addition is generally in the range from 0.1 to 5 phr, preferably 0.1 to 1.5 phr.

Sulfur donors which may in general be considered are derivatives of thiuram, in particular tetramethylthiuram disulfide, tetraethylthiuram disulfide, tetrabutylthiuram disulfide and tetrabenzylthiuram disulfide. These may in turn be used in combination with other components containing sulfur, for example dithiomorpholide, dithiocaprolactam or other compounds having a di-, tri-, tetra- or polysulfide structure.

The rate of addition of the thiuram derivatives is conventionally in the range from 0.5 to 5 phr, preferably 1 to 2.5 phr. The rate of addition of the complementary components containing sulfur should generally be selected in the range from 0.1 to 3 phr, preferably from 0.5 to 1.5 phr.

Sulfur vulcanizing systems may moreover contain accelerators. Accelerators which are preferably considered are those of the mercaptobenzothiazole or mercaptobenzothiazyl disulfide type at rates of addition generally in the range from 0.5 to 3 phr, preferably from 0.5 to 1.5 phr or so-called sulfenamides, such as for example cyclohexylbenzolthiazylsulfenamide (CBS), tert.-butylbenzothiazylsulfenamide (TBBS), morpholine benzothiazylsulfenamide (MBS), dibenzylbenzo-thiazylsulfenamide (DCBS), wherein these are conventionally used at rates of addition in the range from 0.5 to 3, preferably from 0.5 to 1.5 phr.

It may, furthermore, be advantageous to use the following additives:

zinc salts of dithiocarbamic acids at rates of addition in the range from 0.5 to 1.5 phr, derivatives of dithiophosphoric acid, guanidines and other amine accelerators conventional in the rubber industry, retarders, such as phthalic acid, phthalic anhydride, benzoic acid or salicylic acid or other organic acids, such as N-nitroso compounds or such as N-cyclohexylthiophthalimide or other sulfonamide derivatives, such as Vulkalent E/C from Bayer AG.

Any combination of vulcanizing agents and accelerators generally requires activators, preferably zinc oxide and fatty acids. The rate of addition of zinc oxides is conventionally in the range from 2 to 15 phr, preferably from 3 to 5 phr. One suitable fatty acid is, for example, stearic acid, which is generally used at rates of addition in the range from 0.1 to 2 phr, preferably from 0.3 to 1 phr.

Mixing generally proceeds at temperatures in the range from 150 to 200° C., preferably from 160 to 190° C., optionally under a pressure of 10 to 200 bar. After mixing, the mixtures may be post-cured by being kept at elevated temperature.

Especially when the volume being mixed is large, it is often advantageous to produce a homogeneous mixture of rubber and vulcanizing agent at low temperatures and then to increase the mixing temperature.

The mixtures according to the present invention may, moreover, contain conventional additives.

Additives which may be considered are, for example, the vulcanization activators known to the person skilled in the art, in particular, metal oxides, such as zinc oxide or magnesium oxide, antioxidants, such as alkyl-substituted diphenylamines, mercaptobenzimidazoles, unsaturated ethers, such as Vulkazon® AFD (Bayer AG, Germany), or cyclic, unsaturated acetals, such as Vulkazon® AFS/LG (Bayer AG, Germany). Other additives which may be mentioned are:

plasticizers, in particular carboxylic acid esters, such as sebacic acid and the derivatives thereof or trimellitic acid and the derivatives thereof processing auxiliaries, in particular stearic acid and the derivatives thereof, such as zinc stearate or polymers, such as poly(ethylene/vinyl acetate) (Levapren® from Bayer AG, Germany) or poly(ethylene/vinyl acrylate) (VAMAC® from DuPont).

It may, furthermore, be advantageous to incorporate fillers into the rubber mixture according to the present invention. These may or may not have a reinforcing action.

Fillers which may, for example, be mentioned are:

carbon blacks, such as MT, GPF, SRF and especially FEF blacks, metal oxides, such as titanium dioxide (especially as a white pigment)

silicates, such as sodium aluminium silicate silicas, preferably precipitated silicas So-called active fillers in accordance with proposal ISO 5794, appendix D, part 1, for example published on page 535 of "Handbuch für die Gummiindustrie" from Bayer AG, 1992, Leverkusen are preferably suitable for improving abrasion properties.

clays, mica, talcum.

It may, additionally, be advantageous to use additional activators for improving adhesion between filler and rubber, such as for example silanes, such as Ucarsil® RC-1 (Union Carbide, US). Pigments may, furthermore, be added.

The quantities of the individual mixture components depend upon the intended purpose of the mixture and may be determined by some preliminary testing.

As a rule, the additives (substantially additives and fillers) are used in the following quantities (in each case in phr= parts per hundred parts of rubber):

antioxidants in the range from 0 to 4 phr, retarders in the range from 0 to 2 phr, metal oxides, such as ZnO, in the range from 0 to 30 phr, fillers in the range from 0 to 150 phr, preferably active fillers, plasticizers in the range from 0 to 20 phr, processing auxiliaries in the range from 0 to 2 phr.

It is a routine matter for the person skilled in the art to tailor the properties of the mixtures according to the present invention to the exact requirements by adding further polymers, such as BR, NR, IIR, IR, CR, SBR, AEM, ACM or fluoropolymers.

The additives and fillers are incorporated by mixing operations. Care must be taken in this respect that the mixture is not degraded during the mixing operation. It may accordingly be advantageous to provide cooling during the mixing operation.

The resultant mixtures may be further blended with vulcanizing agents, in order to obtain vulcanizable mixtures which are then ultimately converted into moldings of all kinds.

These vulcanizing agents are in general always added when vulcanization is not to be performed with high-energy radiation. The above-stated vulcanizing systems and components are suitable for this purpose, as are also any further vulcanizing agents known to the person skilled in the art which become active only above the mixing temperature in the process according to the present invention; peroxides having a decomposition temperature above the mixing temperature in the process according to the present invention are explicitly also mentioned in this connection.

Depending upon the intended purpose, in addition to the stated peroxides, the following peroxides are, for example, suitable:

dialkyl peroxides, ketal peroxides, aralkyl peroxides, peroxide ethers, peroxide esters, such as for example di-tert.-butyl peroxide, bis(tert.-butylperoxyisopropyl)benzene, dicumyl peroxide, 2,5-dimethyl-2,5-di(tert.-butylperoxy)hexane, 2,5-dimethyl-2,5-di(tert.-butylperoxy)-3-hexene, 2,5-dimethyl-2,5-di(tert.-butylperoxy)hexyne, 1,1-bis(tert.-butylperoxy)-3,3,5-trimethylcyclohexane, benzoyl peroxide, tert.-butylcumyl peroxide and tert.-butyl perbenzoate.

In order to avoid scorching, the vulcanizing system is in this case often added as the final component, optionally in a separate mixing operation.

Further suitable vulcanizing agents are sulfur or sulfur donors together with combinations of these components, which have already been described.

Unsurprisingly, the mixtures produced by the process according to the present invention are indistinguishable by DSC measurements from conventionally produced mixtures. It may, however, be proven by GPC analysis that primarily the olefin rubber phase, but probably also, although to a lesser degree, the nitrile rubber phase, has undergone structural modification.

In mixtures with and without vulcanizing agents, an at least bimodal elution diagram is obtained, which is determined by the narrower distribution of the olefin rubber in the range of lower molecular weights and by the wide nitrile rubber distribution in the range of elevated molecular weight distribution.

However, the reaction in the process according to the present invention gives rise to a modified mixture. The range of lower molecular weights determined by the olefin rubber is widened and the content thereof of fractions with a molecular weight of below $5 \times 10^5$ g/mol is reduced.

The most important result is the improvement in phase distribution, evident from microscopic examination, of the polymer components, as shown in FIGS. 1–3. FIG. 1 shows the phase distribution in a mixture according to the prior art, while FIGS. 2 and 3 show the improvement achieved by the process according to the present invention.

In comparison with moldings made from conventionally produced mixtures, the moldings produced from these mixtures are generally characterized by improved mechanical properties and by better resistance in mineral oils.

Moldings are taken to mean not only moldings in the conventional sense, such as profiles, belts, rings, seals, damping elements, but also coatings, coverings and other flat or three-dimensional structures.

Further moldings primarily used in oil extraction are:

seals of various designs on drill pipes, suspension gear and tubes, such as for example O rings and lip seals, individually or as packings, packer seals and the like, adjusting elements, spacers, protectors and resilient bearings (also inflatable) for drill pipes, suspension gear, tubes and equipment, seals and inserts for blow out preventers, seals, membranes and balls for control valves and similar devices, seals, membranes and bubbles for pulse dampers and the like, closing bungs, seals, membranes, rotors (impellers) and stators for pumps, bungs and seals for pipe cleaning, reinforced and unreinforced hoses, floating hoses, cable insulation and sheathing.

Especially for coatings, it may be advantageous to improve rubber/substrate adhesion by adhesion promoters such as dispersions/solutions of halogenated polymers, optionally comprising vulcanizing agents/fillers/pigments. These substances are commercially available and are described, for example, in EP-A2-0 252 264, which is hereby incorporated into the present application as a reference for the purposes of US patent practice.

The following Examples illustrate the invention, without there being any intention to restrict it.

EXAMPLES

| Measurement methods | |
|---|---|
| Residual double bond content | IR spectroscopy |
| Mooney viscosity | ASTM D 1646 (stated in MU) |
| Volatile constituents (wt. %) | ASTM D 1416 |
| Ash content (wt. %) | ASTM D 1416 |
| Acrylonitrile (ACN) content (wt. %, polymer bound) | in accordance with the following method: |

Brief Description of Process for Determining ACN Content

For the purposes of the analysis, the rubber is pyrolyzed on a catalyst at 900° C. in a stream of oxygen. The unconsumed oxygen is absorbed in a copper reduction reactor and the resultant NO—X gases are reduced to nitrogen. An $Na_2CO_3$/NaOH trap is then used to remove the $CO_2$ present in the gas stream under analysis and an $MgClO_4$ trap to remove the water. The change in thermal conductivity of the gas under analysis in comparison with the carrier gas stream is a measure of the nitrogen content of the sample.

Equipment for the Process

Protein analyser, from Fisons, model NA 2000

Microbalance, from Sartorius, Micro model

Evaluation unit, from Digital, model DECpc Lpd 433 dx with interface to NA 200 and balance interface, together with EAGER 200 software Chemicals and Solvents for the Process Methionine, from Hekatech

| Formulation constituents | | |
|---|---|---|
| Therban ® C 3467 | Bayer AG | HNBR with 5.5% RDB, 34% ACN, 68 MU (ML(1 + 4) 100° C.) |
| Therban ® C 3446 | Bayer AG | HNBR with 2.9–5.0% RDB, 34% ACN, 58 MU (ML(1 + 4) 100° C.) |
| Buna ® EP G 3440 | Bayer AG | EPDM with 48% ethylene, 4.1% ENB, 28 MU (ML(1 + 4) 125° C.) |
| Zinkoxyd ®, active | Bayer AG | active zinc oxide |
| Scorchguard ® O | Rhein Chemie Rheinau GmbH | magnesium oxide paste |
| Naugard 445 | Uniroyal | substituted diphenylamine |
| Vulkanox ® ZMB 2 | Bayer AG | zinc methylmercapto-benzimidazole |
| Rhenocure ® M | Rhein Chemie Rheinau GmbH | dithio-bis-morpholine |
| Edenor HTIG | Henkel KGaA | stearic acid |
| Diplast TM 8–10/ST | Lonza SpA, Italy | trioctyl mellitate |
| Carbon black N772 | Columbina Carbon | |
| Carbon black N550 | Degussa-Hüls AG | |
| Vulkacit ® thiuram | Bayer AG | tetramethylthiuram disulfide |
| Vulkacit ® CZ | Bayer AG | N-cyclohexyl-2-benzo-thiazylsulfenamide |

-continued

| Formulation constituents | | |
|---|---|---|
| Perkalink 301 | Flexsys AG | triallyl cyanurate |
| Trigonox 29/40 | AkzoNobel N.V. | 1,1-bis(t.-butylperoxy)-3,3,5-trimethylcyclohexane, 40% active substance |

Example 1

A mixture of the following composition is produced in a laboratory internal mixer, GK 1.5 E (manufacturer: Krupp Elastomertechnik):

Therban® C 3446: 70 wt. %

Buna® EP G 3440: 30 wt. %

Trigonox 29/40: 2 wt. %

The mixture is produced under the following conditions:

| | |
|---|---|
| Cooling water temperature: | 80° C. |
| Rotor speed: | 70 rpm |
| Plunger pressure: | 6 bar |
| Filling level: | 78% |

The polymeric components are initially introduced, the peroxide is added after 1 minute and the temperature rises to above 150° C. within a further 2.5 minutes. After a total mixing time of 3.5 minutes, the mixture is discharged. Despite the addition of peroxide, the mixture is plastic.

In comparison with an identical mixture produced without added peroxide, the following properties are measured:

| | Mixture with peroxide | Mixture without peroxide |
|---|---|---|
| ML 1 + 4/100° C. (MU) | 120 | 70 |

(Determined to ASTM D 1646. In accordance with the instructions in the standard, the mixture sheets are pretreated in a roll mill before measurement).

The mixtures with peroxide exhibit distinctly improved phase structures (method: phase-contrast microscopy)

FIG. 1 without peroxide: phase separation

FIG. 2 with peroxide: no phase separation

It may furthermore be observed that the mixture according to the present invention exhibits a distinctly higher Mooney viscosity, which would indicate that a reaction has occurred during mixing.

These mixtures are the polymeric base for mixtures of the following composition:

TABLE 1

| Test formulations | | |
|---|---|---|
| | Peroxide vulcanization | Sulfur vulcanization |
| HNBR/EPDM blend | 100 | 100 |
| Edenor HTIG | | 1 |
| Zinkoxyd, active | 2 | 5 |
| Scorchguard O | 2 | |
| Carbon black N 772 | | 65 |
| Carbon black N 550 | 50 | |
| Diplast TM 8-10/ST | 5 | 5 |

TABLE 1-continued

Test formulations

| | Peroxide vulcanization | Sulfur vulcanization |
|---|---|---|
| Vulkanox ZMB2 | 0.4 | |
| Naugard 445 | 0.5 | |
| Perkalink 301 | 1.5 | |
| Dicumyl peroxide (40%) | 5 | |
| Rhenocure M | | 1.1 |
| Vulkacit thiuram | | 1.1 |
| Sulfur | | 0.5 |
| Vulkacit CZ | | 0.8 |

This mixture is produced in a further mixing step in the same mixing unit.

The mixing conditions for this purpose are selected in the conventional manner, namely:

| Mixer GK 1.5 E | |
|---|---|
| Chamber/blade temperature | 50° C. |
| Plunger pressure | 8 bar |
| Rotational speed | 40 rpm |
| Filling level | 70% |

Mixing Cycle:

Introduce polymer and mix for 60 seconds add fillers, chemicals, plasticizer and mix for 90 seconds sweep mix for 60 seconds or up to a max. of 145° C.

discharge place cleaning chemicals on the roll.

Once discharged, the mixture is vulcanized at 170° C./30 minutes. The following properties are determined on sample sheets in accordance with standards (essentially DIN 53 504).

TABLE 2

Properties of the mixtures

| | Mixture without peroxide | Mixture with peroxide |
|---|---|---|
| Strength (MPa) (DIN 53 504) | 15 | 20 |
| Elongation at break (DIN 53 504) | 305 | 280 |
| Modulus (100% elongation) (MPa) (DIN 53 504) | 4.4 | 5.8 |
| Shore A hardness (DIN 53 505) | 68 | 71 |
| Immersion in standard oil IRM 903, 3d/135° C. Change in volume | 96% | 60% |

Example 2

In internal mixers with a capacity suitable for industrial production, the process and formulation must be modified as the peroxide is distributed less rapidly and localized inhomogeneities give rise to undesirably high levels of vulcanization at these points, resulting in a negative impact upon the processability of the final product.

This step is illustrated by making the transfer from the GK 1.5 E internal mixer described above to a GK 90 E internal mixer, both of which have an intermeshing rotor geometry.

The external mixing conditions had to be adapted as follows:

TABLE 3

Mixing conditions, comparison of GK 1.5 E and GK 90 E

| | | GK 1.5E | GK 90E |
|---|---|---|---|
| Temperature | ° C. | 80 | 80 |
| Rotor speed | rpm | 70 | 20 rpm, then 70 rpm |
| Plunger pressure | bar | 6 | 8 |
| Filling level | % | 78* | 73** |

*Standard: 72%
**Standard: 65%

It is essential to provide variable motor speeds with an initially low rotational speed (20 rpm) and slight evolution of temperature in order to ensure homogeneous dispersion of the peroxide and then to increase the rotational speed in order to generate the temperature necessary for the reaction.

Figure 4:
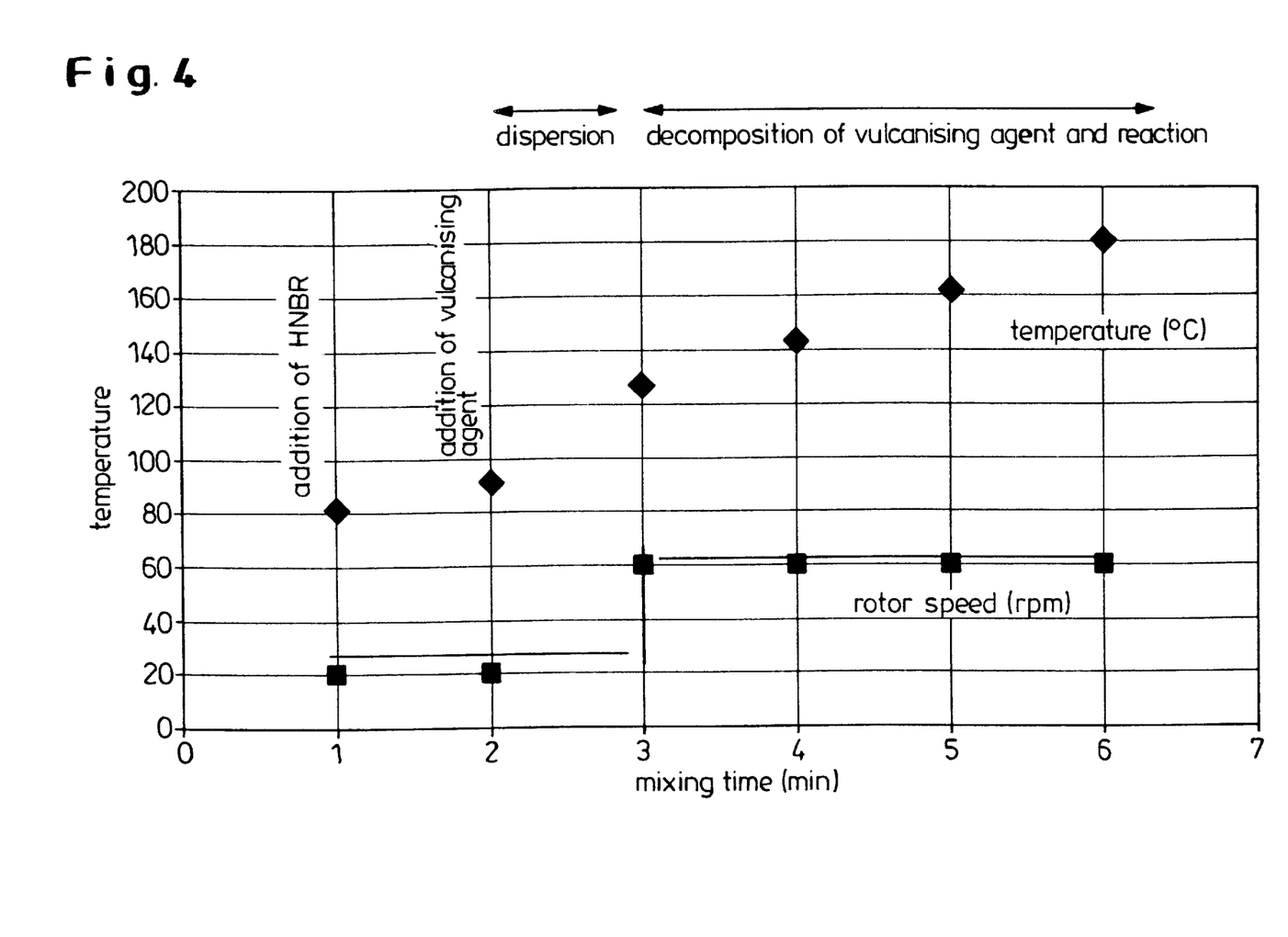
FIG. 4 shows a diagrammatic representation of mixture production in GK 90 E internal mixer

On this basis, production of the mixture in the GK 90 E internal mixer proceeds in accordance with the following diagrammatic representation (FIG. 4).

FIG. 4: Diagrammatic representation of mixture production in GK 90 E internal mixer At the low rotational speed, the temperature of the composition remains below 120° C. Under these conditions, the peroxide undergoes virtually no decomposition for this period of mixing, but is instead only dispersed. As soon as the speed is raised to 70 rpm, the temperatures of approx. 190° C. required for the coupling reaction are achieved within the following 4 minutes.

The rate of peroxide addition suitable for this purpose was determined from the following preliminary tests and, in the present case, was set at 1 phr, as good processability may still be anticipated at 80–90 MU (Table 4):

TABLE 4

Influence of rate of peroxide addition upon Mooney viscosity of mixture in GK 90 E internal mixer

| Test no. | A | B | C | D |
|---|---|---|---|---|
| Therban ® C 3446 | 70 | 70 | 70 | 70 |
| Buna ® EP G 3440 | 30 | 30 | 30 | 30 |
| Trigonox 29/40 | 0 | 0.5 | 1 | 1.5 |
| Mixing temperature (° C.) | 184 | 183 | 185 | 186 |
| ML 1 + 4/100° C. (MU) | 49 | 66 | 88 | 110 |

Batch-off treatment of the mixture with peroxide proceeded without problems. The mixture sheet was plastic. There were no observable signs of scorching.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An incompletely vulcanized rubber mixture comprising
   (i) one or more olefin rubbers,
   (ii) one or more nitrile rubbers, and (iii) a vulcanizing agent which is active at or below a temperature at which (i), (ii) and (iii) are mixed, wherein there is no phase separation in the mixture.

2. A rubber mixture according to claim 1, wherein said one more nitrile rubber(s) are selected from the group consisting of NBR, partially hydrogenated NBR, completely hydrogenated NBR or mixtures of two or more of the members of the group.

3. A rubber mixture according to claim 1, wherein the olefin rubber(s) are selected from the group of copolymers prepared from ethylene and one or more α-olefins, terpolymers prepared from ethylene, one or more α-olefins and one or more unconjugated dienes, and mixtures thereof.

4. A rubber mixture according to claim 1, wherein the mixture comprises one or more additives and/or fillers.

5. A rubber according to claim 1, wherein the mixture is more than 95% soluble in organic solvents selected from the group consisting of dichlorobenzene, methyl ethyl ketone or mixtures thereof.

6. A vulcanized rubber mixture comprising the incompletely vulcanized rubber mixture of claim 1 and (iv) an additional vulcanizing agent, wherein there is no phase separation in the mixture, and wherein (iv) the additional vulcanizing agent completes the vulcanization of the mixture.

7. The vulcanized rubber mixture according to claim 6, wherein the (iv) vulcanizing agent is peroxide, sulfur, thiuram or a mixture thereof.

8. The vulcanized rubber mixture according to claim 6, wherein the mixture comprises vulcanization retarders and/or vulcanization accelerators.

9. A molding comprising a rubber mixture according to claim 6.

10. The incompletely vulcanized rubber mixture according to claim 1, wherein the vulcanizing agent is peroxide, sulfur, thiuram or a mixture thereof.

11. The incompletely vulcanized rubber mixture according to claim 10, wherein the vulcanizing agent is a peroxide.

12. The incompletely vulcanized rubber mixture according to claim 11, wherein the vulcanizing agent is bis-(2,4-dichlorobenzyl) peroxide, dibenzoyl peroxide, bis(4-chlorobenzoyl) peroxide, 1,1-bis(t.-butylperoxy)-3,3,5-trimethylcyclohexane, tert.-butyl perbenzoate, 2,2-bis-(t.-butylperoxy)butene, 4,4-di-tert.-butyl peroxynonylvalerate or 2,5-dimethyl-2,5-di(tert.-butylperoxy)hexane.

13. The incompletely vulcanized rubber mixture according to claim 12, wherein the vulcanizing agent is 2,5-dimethyl-2,5-di(tert.-butylperoxy)hexane.

14. The incompletely vulcanized rubber mixture according to claim 11, wherein the peroxide is present in a quantity in the range from 0.2 to 5 phr, relative to the rubber.

15. The incompletely vulcanized rubber mixture according to claim 14, wherein the peroxide is present in a quantity in the range from 0.5 to 3 phr, relative to the rubber.

* * * * *